Nov. 28, 1967  D. P. DYER, JR  3,354,705
TORQUE-TENSION TESTING APPARATUS AND METHOD
FOR NUT-BOLT ASSEMBLIES
Filed June 21, 1965  3 Sheets-Sheet 1

INVENTOR.
DANIEL P. DYER, JR.
BY
*John B. Sowell*
ATTORNEY

INVENTOR.
DANIEL P. DYER, JR.
BY John B. Sowell
ATTORNEY

United States Patent Office 3,354,705
Patented Nov. 28, 1967

3,354,705
TORQUE-TENSION TESTING APPARATUS AND METHOD FOR NUT-BOLT ASSEMBLIES
Daniel P. Dyer, Jr., Grosse Pointe Park, Mich., assignor to The Budd Company, Philadelphia, Pa., a corporation of Pennsylvania
Filed June 21, 1965, Ser. No. 465,623
1 Claim. (Cl. 73—95)

ABSTRACT OF THE DISCLOSURE

The apparatus comprises means for mounting a workpiece to be bolted, for instance an automobile wheel disk, means for mounting a stud bolt for measurement of its tension, means for continuously turning a nut through its tightening range, on and off, means for measuring the bolt tension continuously, and recorder means for registering and plotting torque and tension continuously and coordinately.

This invention relates to torque-tension testing apparatus and method for nut-bolt assemblies, particularly for testing bolt tension conjointly with nut torsion, and has for an object the provision of improvements in this art.

It is now the current practice to test the condition of bolt-nut assemblies by applying a torque wrench to the nut and measuring the force required to turn the nut on the bolt. The turning action involves a series of relatively short turning movements interrupted by intervening halts. The starts necessarily involve static friction as well as the kinetic or dynamic friction of steady turning which it is desired to measure and at each halt there is a slight elongation of the bolt with corresponding reduction in tension; hence the wrench torsion method does not give a true indication of the loading involved.

Moreover, the method of testing by torsion alone does not furnish a true measure of the efficiency of the nut-bolt assembly because the ultimate object is to secure the desired tension in the bolt and it will be apparent that the torsion will vary in accordance with the interior friction of the threads and the exterior friction between the nut and the surface over which it turns without proportionate tensioning of the bolt.

Bolt tension, not alone nut torque, is the criterion of the effectiveness of a bolted construction. Reliance on the torque wrench measurements can be misleading. Because of the factors mentioned above, overstressing or understressing of as much as 50 percent, or even more, can result, even though each nut is carefully turned up by an accurately calibrated and properly operated torque wrench.

Adequate optimum bolt tension is required, not only to attain the desired clamping force and resistance to loosening, but also to provide protection against high and damaging dynamic stresses.

Actually, what is needed is an accurate measurement of both nut torque and bolt tension, and this in a single coordinated form which provides a quick and accurate report on the relationship. This torque-tension relationship in chart or diagram form provides a reliable basis for establishing proper bolt and nut tightening specifications, i.e., for selecting appropriate finishes, coatings, or platings and for determining the best fastener materials, sizes, threads and the like, so that when a given torque is specified for factory assembly procedure there will be adequate assurance that the desired bolt tension is being established.

The torque-tension ratio is influenced by the physical and dimensional properties of the bolt, nut, and bolted materials, as well as by the effects of the type of plating, lubrication, galling, and other factors. Heretofore the measurement of these characteristics by conventional methods has been long, tedious, and expensive, involving the measurement and plotting of increments of bolt elongation or strain against torque wrench readings.

According to the present invention, means and method are provided for obtaining the desired data quickly, accurately, and easily in the form of a single chart or X-Y graph on which the nut torque and bolt tension are plotted as coordinate functions. Moreover, the effects of static friction components, characteristic of torque wrench testing, are eliminated and only the moving torque friction is plotted.

It is therefore one of the objects of the invention to provide means and method for determining torque and tension coordinately.

Another object is to provide apparatus and method which are simple and convenient and largely automatic, requiring only a minimum of personal intervention, and with corresponding faster and more dependable results.

The above and other objects of the invention, as well as various novel features and advantages, will be apparent from the following description of an exemplary embodiment of apparatus for practicing the invention, and in which.

Figure 1:
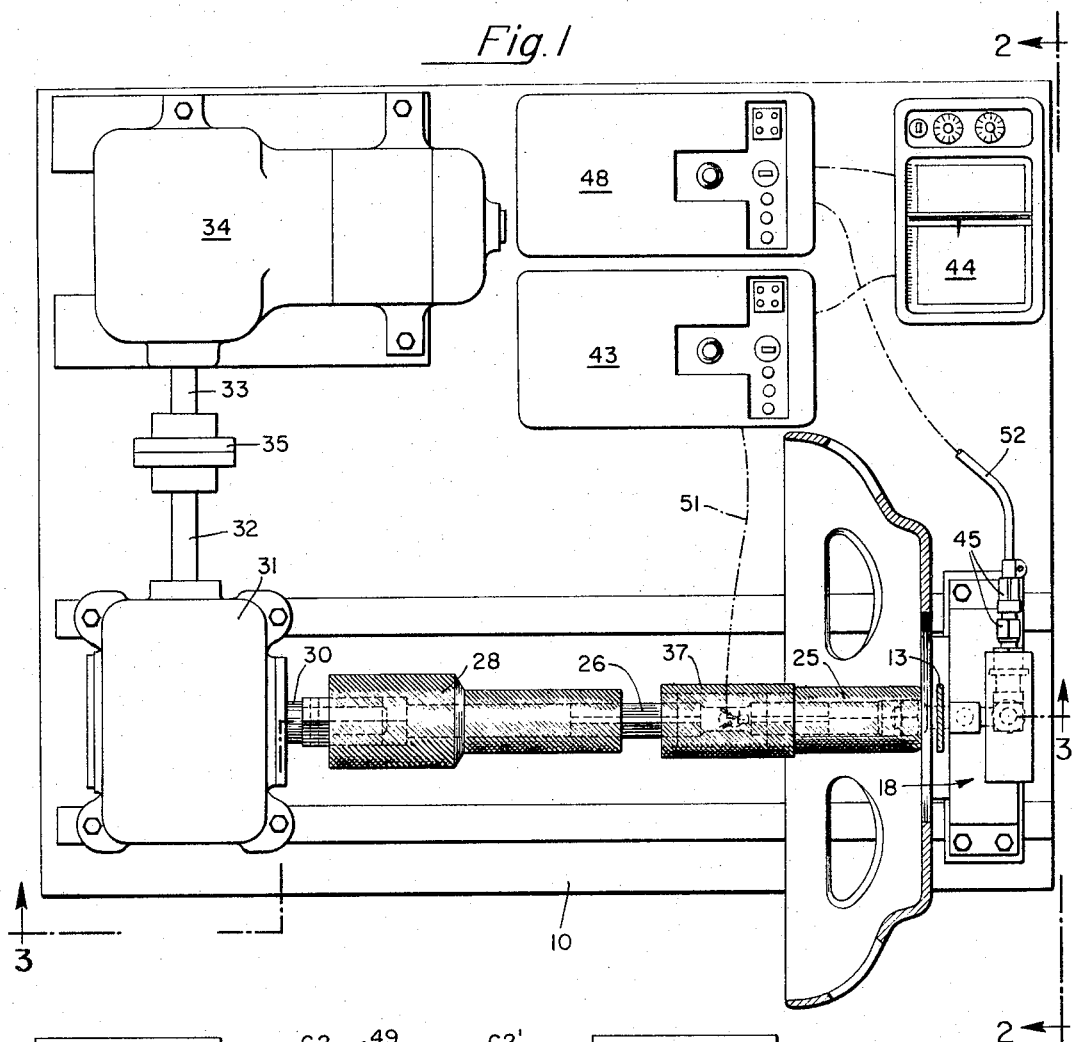
FIG. 1 is a plan view of apparatus embodying the invention.

In general, the apparatus comprises means for mounting a workpiece to be bolted, in the present instance an automobile wheel disk, means for mounting a stud bolt for measurement of its tension, means for continuously turning a nut on the bolt through its tightening range, on and off, means for measuring the bolt tension continuously, means for measuring the nut torsion continuously, and recorder means for registering and plotting torque and tension continuously and coordinately.

A main frame, generally designated by the numeral 10, forms a support for the apparatus. A super frame 11 is provided with a bolt backing plate 12 and an upstanding bracket 13 carrying a stud 14 adapted to enter one of the holes W1 of a wheel disk W. In a lower hole of the disk W there is disposed a bolt T having threaded thereon a nut N, the bolt and nut assembly being the unit to be tested. The nut is initially threaded far up on the bolt before the torque testing means is applied because the tightening effect is produced only in the last stages of the turning of the nut on the bolt.

The head T1 of the bolt T is carried by the inner body or piston 17 of a tension test device 18 available on the market, the particular one shown being known as a Skidmore-Wilhelm tester. The piston 17 is disposed in a cylinder 19 with liquid 20 in a chamber between and having means to resist turning of the bolt. The pressure of the fluid, as an indication of the tension on the bolt, is registered on a gage 21. The tension test device 18 is bolted to the frame 11 and carries the disk supporting plate 12 and bracket 13.

Means are provided for turning the nut N in and out, each direction in continuous motion, to apply and release its torqued relationship with the bolt, the means shown comprising a socket wrench 25 embracing the nut, a calibrated test torsion bar 26 secured in the socket wrench, as by one or more screws 27, and a motor driven socket sleeve 28 fitting non-turnably on the other end of the torsion bar. The sleeve 28 is secured, as by one or more set screws 29, to the output shaft 30 of a reduction gear unit 31, which gear unit has its input shaft 32 driven by the shaft 33 of a motor-gear unit 34, a flexible coupling 35 of suitable type forming a drive connection between the shafts 31, 32.

The torsion bar 26 is slidable in and out in the sleeve 28 to allow the socket wrench to be moved into working position or out of the way of the disk-bolt zone of insertion and removal. The nut is turned up, as by hand, before the wrench is pushed up into operative position. When so pushed up, it may be held in forward position by turning in a screw 36 which grips the sleeve 28 to the torsion bar 26.

A protective sleeve 37 is secured over the intermediate portion of the torsion bar 26, being secured to the wrench 25, as by the same screw 27 which secures the wrench to the torsion bar. At the other end the protective sleeve turns on a collar 38 which fits on and is secured to the torsion bar, as by a screw 39. This arrangement accommodates the small turning movement needed while preventing any part of the load being placed on the protective sleeve, all the load being transmitted through the torsion bar where it can be measured.

Means are provided for automatically and continuously sensing registering, and recording the torsion on the nut as transmitted through the test torsion bar 26 and for sensing, registering and recording the tension on the bolt as transmitted through the liquid in the tension test device 18. It may here be noted that the liquid type test device is shown because it was the one which was available and used. A mechanical type load cell could be readily substituted.

Both torsion and tension are sensed by electrical transducers of suitable type, bonded metallic strain gages being used here.

Figure 4:
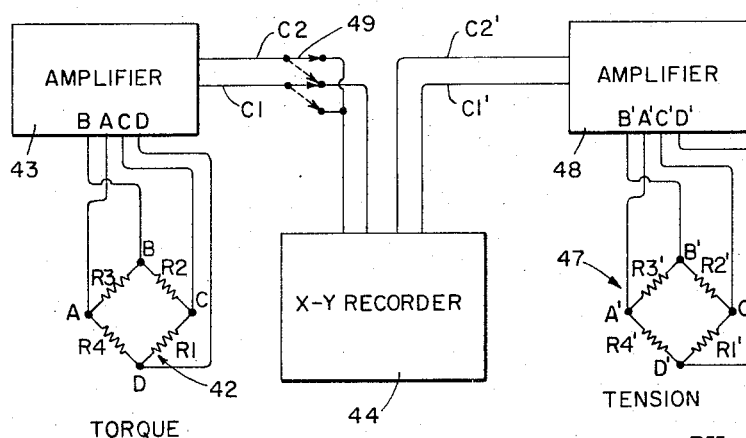
FIG. 4 is a schematic diagram of the recording apparatus and circuitry.
Figure 2:
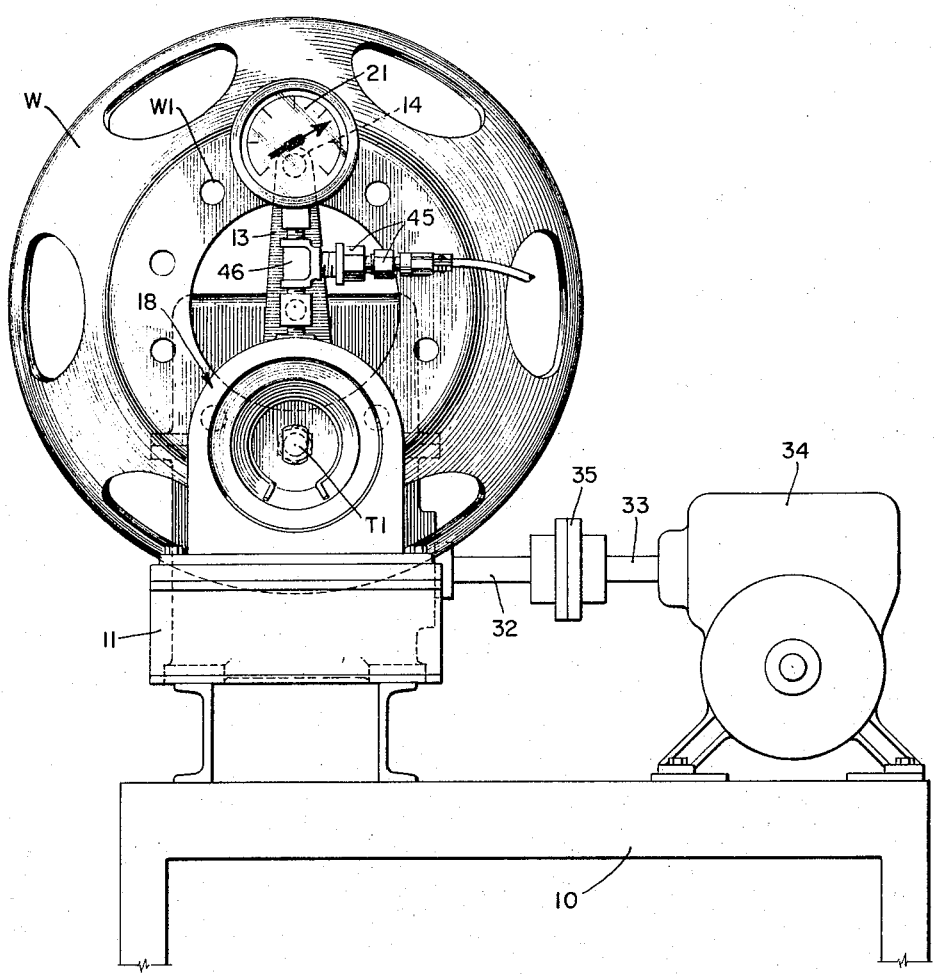
FIG. 2 is an end elevation taken on the line 2—2 of FIG. 1, some of the recording apparatus being omitted for clarity.

On the torsion bar 26 there are provided bonded metallic strain gages arranged in forward and reverse pairs R1, R2 and R3, R4, each pair being arranged in known manner so that one gage registers compression and the other tension, the strain gages being arranged in a bridge circuit 42 (FIG. 4). The bridge is excited and its output amplified by an amplifier 43 of known type, the one used being a Brush amplifier. The signal output of the bridge 42 is transmitted, as a measure of nut torque, by conductors C1, C2 to an X–Y recorder 44 of known type, the one used being a Mosely recorder. The input to the bridge is at points A and C and the output is at points B and D.

The tension signal measuring device, as herein shown, comprises a liquid pressure load cell 45, available on the market as a Norwood pressure transducer, connected, as by a fluid tap line 46 with the liquid line of the tension test device 18. Strain gages R3′, and R4′ are provided in the load cell 45, these gages being disposed as resistances of tension and compression in a bridge 47 having standard resistances R1′, R2′. The input is at A′ and C′ and the output is at B′ and D′. The output of the bridge 47 is transmitted, as a measure of bolt tension, through an amplifier 48 and conductors C1′, C2′ to the X–Y recorder 44.

A switch 49 is provided for shifting from nut-tightening travel to nut-loosening travel and, if desired, may be arranged to have an off position. When the switch 49 is reversed for each on-off cycle, a switch (not shown) which reverses the direction of turning of the motor which drives the wrench is reversed, and these switch actions may be ganged for convenience, if desired.

The amplifiers 43 and 48 are provided with visual meter devices for the observation of input and output, the usual circuit setting and adjusting means also being provided. The X–Y recorder 44 is also provided with its usual controls and visual indicators as well as its graph recording means.

Figure 3:
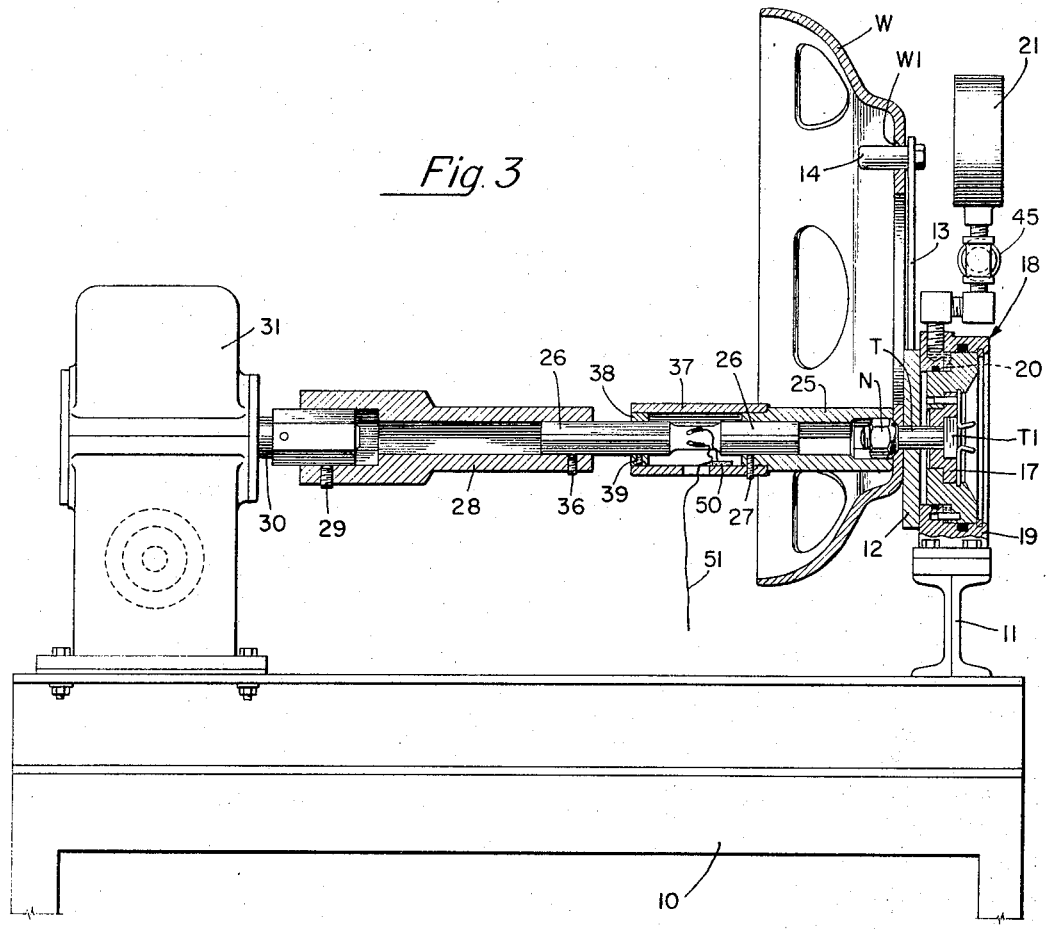
FIG. 3 is a partial vertical section taken on the line 3—3 of FIG. 1.

As shown in FIG. 3, the leads from the strain gages on the test torque bar 26 are carried to a connection point on an insulator 50 secured within the protective sleeve 37, a cable 51 carrying all of the leads from the connection on the insulator to the amplifier 43. In use, the cable 51 is wound on and unwound from the sleeve 37 as the nut is turned on and off but this causes no difficulty because the cable is very light and flexible and the turning range is quite small, being only a few turns at most. If desired, slip rings of known type may be used but as the apparatus has been used thus far, slip rings have not been needed.

A cable 52 (FIG. 1) carries the leads from the tension test cell 45 to the amplifier 48.

Figure 5:
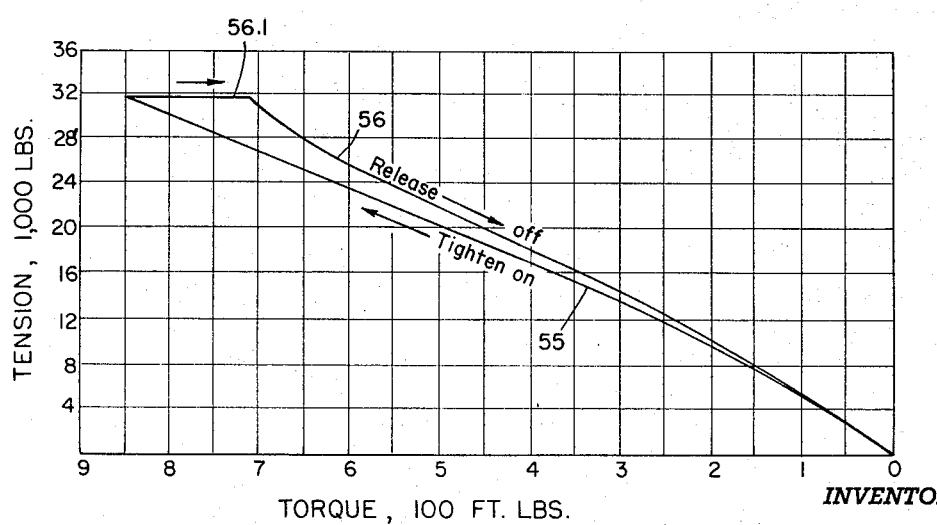
FIG. 5 is a view of an X-Y graph or chart provided by the apparatus on a test.

FIG. 5 shows a representative tension-torque curve which was made by the X–Y recorder on a test. Torque is plotted on the X axis or abscissa and tension is plotted on the Y axis or ordinate. The lower line 55 defines the continuous tightening or turning-on part of the cycle, and the upper line 56 defines the continuous loosening or turning-off part of the cycle. The latter includes an almost horizontal portion 56.1 which indicates an initial reduction in torque with relatively little reduction of tension in the bolt. The open space in the closed hysterisis-type curve produced in a full on-off cycle gives an indication of the coefficient of friction between the nut and the surfaces contacted by it.

The equipment is particularly useful for repeated on-off tests to reveal the relative wearing characteristics of different coatings, for example, zinc, lead, copper, chromium, oxides, and the like. It is not necessary to make an X–Y chart of each on-off cycle since the instruments can be observed to show trends and charts made at intervals as desired.

Means (not shown) are provided for setting the upper limits of torque and tension and for cutting off the motor when the preset limit is reached, to prevent injury to motor, test specimen or instruments.

The use of the equipment provided hereby is well known in the art as regards the various items and their conjoint use will be evident from their combination arrangement. It is only necessary to remark that the test wheel and bolt are introduced while the wrench is withdrawn out of the way. After the nut has been put on and turned up into the tightening range by hand, the wrench is brought up to engage the nut and secured in the forward position. The on-off test procedure is then run and charts made as desired until all desired tests on the given specimen have been made. The wrench is then moved back ready for the exchange of test specimens.

While one embodiment of the invention has been described for purposes of illustration, it is to be understood that there may be various embodiments and modifications within the general scope of the invention.

I claim:

A testing method for a nut and bolt combination including simultaneously recording and plotting of tension and torque data for creating a tension-torque curve from continuously turning the threads of a nut on the cooperating threads of a bolt between a position of zero tension and zero torque and a predetermined tension and then returning to the zero positions comprising the steps of:

(1) Mounting a threaded bolt to be tested in a pressure sensitive test device which restrains the bolt from rotative movement and lineal movement in one direction and includes means for indicating tension applied lineally to the bolt in said one direction, (2) Placing a stop means between the ends of the bolt for resisting lineal movement of a nut cooperating with the threads of the bolt, (3) Manually threading a nut on the threads of the bolt until the nut contacts the stop means, (4) Securing turning means to the nut, (5) Connecting a calibrated test torsion bar between the turning means and power means for rotating the nut, (6) Connecting the pressure sensitive test device and the test torsion bar to X–Y graph recorder for simultaneously recording the torque applied to the nut-bolt combination and the tension created therein by movement of the nut, (7) Actuating the power means for rotating the nut until a predetermined tension has been obtained or the nut has traveled a predetermined distance, (8) Reversing the power means until the tension returns to the zero position while recording the reverse tension-torque curve on the X–Y graph recorder whereby cycles of testing may be recorded for showing the effects of wear on the torque requirements for overcoming friction between the nut and bolt.

References Cited

UNITED STATES PATENTS

| | | | |
|---|---|---|---|
| 2,957,342 | 10/1960 | Hanneman | 73—1 |
| 2,978,898 | 4/1961 | Skidmore | 73—95 |
| 3,285,057 | 11/1966 | De Zurik | 73—136 |

RICHARD C. QUEISSER, *Primary Examiner.*

JAMES H. WILLIAMSON, *Assistant Examiner.*